March 4, 1952   J. R. STANFIELD ET AL   2,587,781
PIVOTED VENTILATOR WINDOW OF MOTOR ROAD VEHICLES
Filed Oct. 6, 1950
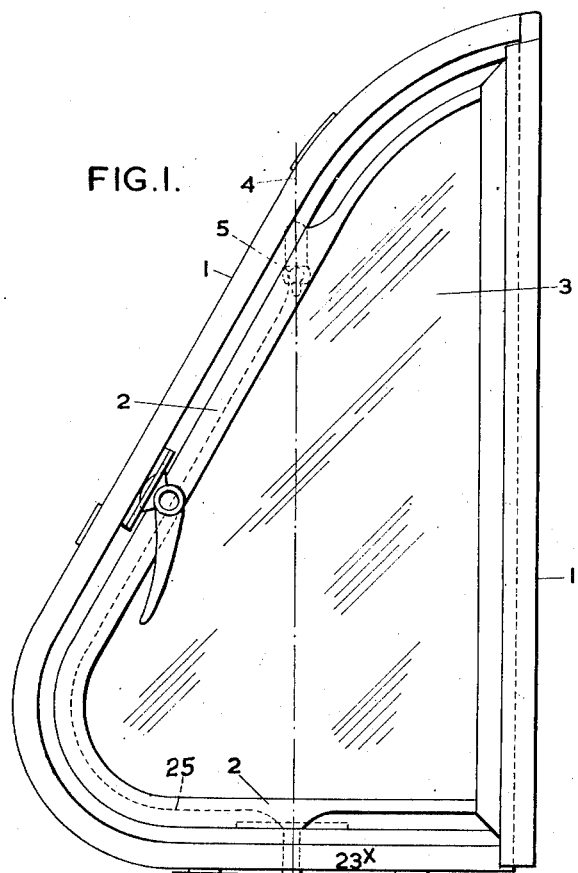
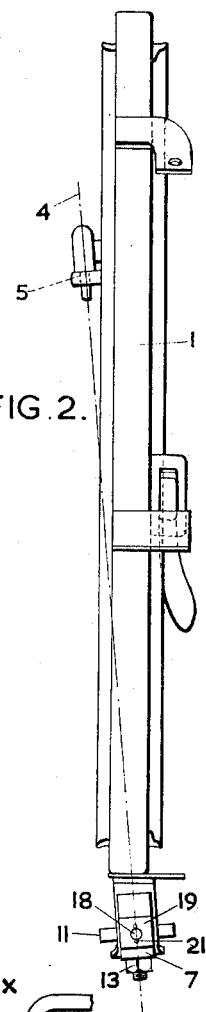
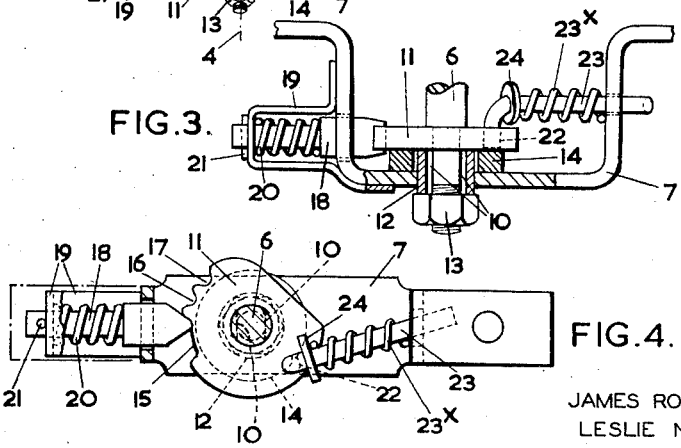
INVENTORS
JAMES ROBERT STANFIELD
LESLIE NORMAN HUGHES
BY
A. Yates Dowell
ATTORNEY Patented Mar. 4, 1952

2,587,781

UNITED STATES PATENT OFFICE 2,587,781

PIVOTED VENTILATOR WINDOW OF MOTOR ROAD VEHICLES

James R. Stanfield, Castle Bromwich, Birmingham, and Leslie N. Hughes, Rednal, Birmingham, England, assignors to The Austin Motor Company Limited, Birmingham, England Application October 6, 1950, Serial No. 188,774
In Great Britain November 2, 1949

4 Claims. (Cl. 296—44)

1

The invention relates to ventilator windows which are each pivotally mounted, about a pivot axis which is vertical or thereabouts, to a wall or door of a motor road vehicle, the window extending fore-and-aft of its pivot axis.

When the window is closed, its forward part bears outwardly against a rubber sealing strip or bead set in the wall or door whilst the rear part bears inwardly against a similar strip or bead. Hence, to open the window, it must be turned in a direction to cause its forward part to move inwardly and its rearward portion to move outwardly. If the window is to be used as an air extractor, it is moved to an angle of 45 degrees or thereabouts, for maximum extraction, or some lesser angle for varying degrees of extraction. If, however, it is to be used as an air-intake it is turned through an angle of more than 90 degrees.

Heretofore the window has been located in all its required positions simply by pivotal friction, or alternatively with a winding handle through suitable gearing.

According to this invention, the window is located in any of its air-extracting positions and is held in such positions up to 45 degrees or thereabouts from its closed position by a spring-loaded detent engaging in one of a number of notches; but from 45 degrees or thereabouts in the same direction the window is freely impelled by spring means to its air intake position at say 135 degrees or thereabouts.

The invention will now be more fully described with reference to and by the aid of the embodiment shown in the accompanying drawings, in which:

Fig. 1 is a side elevation of a ventilator window for the "off" or right-hand side of the vehicle, and shows the inner side of said window.

Fig. 2 is a front elevation of Fig. 1.

Figs. 3 and 4 are respectively a part sectional side elevation and a plan view of the bottom pivot mounting of the ventilator window and drawn to a larger scale for the sake of clearness.

Referring to the drawings, the ventilator window comprises an outer frame 1, for fixing in a window opening in the "offside" or right-hand wall or door of the vehicle body, and an inner frame 2 which carries the glazing 3 and is mounted for pivotal movement within the fixed frame 1 and about a vertical or almost vertical axis 4 by means of top and bottom pivots 5, 6 respectively.

The lower pivot 6 comprises a pin which extends down through a hole in the base of the

2 fixed or outer frame 1 and into a U-shaped bracket 7 which is secured by studs 8 and nuts 9 to the underside of the said frame 1. The lower end portion of the pivot pin 6 is formed with parallel flats 10 and a disc or plate 11 with a central through hole of a shape corresponding to the section of said lower end portion of the pin 6 is sleeved thereon up to the shoulders afforded at the upper ends of the flats 10. Also a sleeve 12 is sleeved on to the lower end portion of the pin 6 up to the underside of the disc or plate 11 and is retained in position by a nut 13 screwed on to the threaded extremity of said pin 6. The sleeve 12 is a rotational fit in a bearing hole in the base of the U-shaped bracket 7 and turns therein with the pin 6 and within a distancing or locating washer 14 which rests upon said base and supports upon its upper surface the disc or plate 11.

The disc or plate 11 has in its edge a number of V-shaped notches 15, 16 and 17 with which the wedge-shaped head of a plunger 18 can be selectively engaged to locate the pivoted window frame 2 in various positions. The plunger 18 is radially disposed with respect to the disc or plate 11 and is mounted for axial sliding movement in bearing holes in the forward side of the bracket 7 and in the forward end of an auxiliary bracket 19 welded to that side. The plunger 18 is loaded into engagement with the edge of the disc or plate 11 by a helical spring 20 operating between the head of the plunger and the forward end of the auxiliary bracket 19. A split pin 21 is passed through a transverse hole in the forwardly projecting end of the plunger 18 to determine its inward movement under the action of the spring 20.

Pivoted to the disc or plate 11 at 22 is a strut 23 which extends through a clearance hole in the rear side of the bracket 7, and a compression coil spring 23$^x$ sleeved upon the strut 23 bears, at its rear end, against said bracket side and, at its forward end, against an abutment 24 which is in the form of a washer or collar on the forward or pivoted end of the strut 23.

In the drawings the parts are shown in the positions they occupy when the ventilator window is closed, the plunger head being engaged with the notch 15, and opening of the window is opposed by the spring loaded strut 23. The plunger head can be caused to snap into engagement with either notch 16 or notch 17 at will so that the window will be retained in the corresponding position. The notch 16 corresponds to 22½ degrees of opening and the notch 17 corresponds to 45 degrees of opening.

When the window is opened to the 45 degrees position the strut 23 is in the dead centre position, that is to say the axis of the disc or plate 11, the pivotal axis of the strut 23 and the hole in the rear side of the bracket 7 are in line. If, however, the window is pushed open beyond the 45 degrees position, the spring-loaded strut 23 comes into action to continue the pivotal movement until the inner window frame 2 is in such an inclined position that its normally forward portion is directed rearwardly of and inwardly from the pivotal axis 4 preferably at an angle of approximately 135 degrees to the normal or closed position. Such opening movement of the window under the action of the spring loaded strut is free, since the flat edge portion of the disc (see Fig. 4) is clear of the plunger head, and it brings the inner frame 2 with its glazing 3 into an air intake position, and such movement or position may be determined by the frame 2 coming up against an appropriately positioned stop. Such stop may be afforded by the rearwardly presented end of the usual rubber sealing strip, indicated by the reference 25 in Fig. 1, which strip 25 is carried by the forward portion of the fixed frame 1 and is engaged by the forward part of the frame 2 when the latter is in its closed position.

Instead of employing a spring-loaded strut as above described, the opening of the window may be effected by a torsion coil spring anchored at one end to the disc or plate 11 and at its other end to the bracket 7 or other appropriate fixed part, said torsion spring encircling the locating washer 14.

An important advantage of the invention is that it avoids or greatly lessens, the liability of the driver's hand being trapped between the front edge of the window and the steering wheel, since when the window has been opened through slightly more than 45 degrees it is automatically carried round to its air intake position.

Having fully described our invention, what we claim and desire to secure by Letters Patent is:

1. In combination with a pivoted ventilator window for motor road vehicles, and of the kind referred to, a member which has pivotal movement with the window and has a number of locating notches, corresponding to the closed position and predetermined air-extracting positions of the window up to about 45 degrees from the closed position, a spring-loaded detent for engaging any of said notches to locate and hold the window in any of said positions, and spring means connected to said ventilator window and reactable with a fixed bracket for freely impelling the window in the same direction beyond the last of said notches to an air intake position.

2. In combination with a pivoted ventilator window for motor road vehicles, and of the kind referred to a disc member which has pivotal movement with the window and has a number of angularly spaced locating notches, corresponding to the closed position and a number of air-extracting positions of the window up to about 45 degrees from the closed position, a spring-loaded detent in the form of a plunger for engaging any of said notches to locate and hold the window in any of said positions, and spring means in the form of a spring-loaded strut connected to said ventilator window and reactable with a fixed bracket for resisting opening up to about 45 degrees and then passing through a dead centre postion and operating to impel the window to an air intake postion at about 135 degrees.

3. A pivoted ventilator window for motor road vehicles, and comprising a fixed frame, a frame carrying the glazing and pivotally mounted about an approximately vertical axis in said fixed frame, a U-shaped bracket fixed to the base of the fixed frame and affording a bearing for the lower pivot of the pivoted frame, a disc member carried by said lower pivot and having in its periphery angularly spaced locating notches, corresponding to the closed position and a number of air-extracting positions of the window up to about 45 degrees from the closed position, a spring-loaded plunger for engaging any of said notches to locate and hold the window in any of said positions, said plunger being mounted for movement through one limb of said bracket, and a spring-loaded strut which resists opening up to about 45 degrees and then passes through a dead centre position and operates to impel the window to an air-intake position at about 135 degrees, said strut having pivotal connection with the disc and sliding pivotal connection with the opposite limb of said bracket.

4. A pivoted ventilator window for motor road vehicles, as claimed in claim 3, wherein inward movement of the spring-loaded plunger is limited and the disc has an edge portion which clears said plunger when the window is turned in the opening direction to beyond about 45 degrees by the spring-loaded strut.

JAMES R. STANFIELD.
LESLIE N. HUGHES.

REFERENCES CITED

The following references are of record in the file of this patent:

UNITED STATES PATENTS

| Number | Name | Date |
| --- | --- | --- |
| 784,574 | Langdon et al. | Mar. 14, 1905 |

FOREIGN PATENTS

| Number | Country | Date |
| --- | --- | --- |
| 261,011 | Italy | Oct. 27, 1928 |